(12) United States Patent
Fukushima (10) Patent No.: US 11,251,629 B2
(45) Date of Patent: Feb. 15, 2022

(54) ENERGY STORAGE APPARATUS AND CONTROL METHOD OF ENERGY STORAGE DEVICES

(71) Applicant: GS Yuasa International Ltd., Kyoto (JP)

(72) Inventor: Atsushi Fukushima, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 263 days.

(21) Appl. No.: 16/498,941

(22) PCT Filed: Apr. 5, 2018

(86) PCT No.: PCT/JP2018/014544
§ 371 (c)(1),
(2) Date: Sep. 27, 2019

(87) PCT Pub. No.: WO2018/186465
PCT Pub. Date: Oct. 11, 2018

(65) Prior Publication Data
US 2020/0059107 A1    Feb. 20, 2020

(30) Foreign Application Priority Data
Apr. 5, 2017    (JP) .............................. JP2017-075143

(51) Int. Cl.
*H02J 7/00*    (2006.01)
*H01M 10/0525*    (2010.01)
(Continued)

(52) U.S. Cl.
CPC ....... *H02J 7/0021* (2013.01); *H01M 10/0525* (2013.01); *H01M 10/425* (2013.01);
(Continued)

(58) Field of Classification Search
USPC ....................................................... 320/118
See application file for complete search history.

(56) References Cited

U.S. PATENT DOCUMENTS

| 5,602,481 A | 2/1997 | Fukuyama |
| 2005/0127873 A1 | 6/2005 | Yamamoto et al. |

(Continued)

FOREIGN PATENT DOCUMENTS

| JP | H07-255134 A | 10/1995 |
| JP | 2004-127532 A | 4/2004 |

(Continued)

OTHER PUBLICATIONS

International Search Report (ISR) (PCT Form PCT/ISA/210), in PCT/JP2018/014544, dated Jun. 26, 2018.

*Primary Examiner* — Mohammed Alam
(74) *Attorney, Agent, or Firm* — McGinn IP Law Group, PLLC (57) ABSTRACT

An energy storage apparatus includes a plurality of energy storage devices connected in series, a voltage detection circuit that detects voltages of the plurality of energy storage devices, and a discharge circuit that discharges the energy storage devices individually, and a BMU having a control unit, in which the control unit discharges only an energy storage device having a highest voltage among the plurality of energy storage devices. Further, charging is stopped when a first duration elapses in a state that a cell voltage of the energy storage device having the highest voltage exceeds a first voltage threshold, or charging is stopped when a second duration elapses in a state that the cell voltage of the energy storage device having the highest voltage exceeds a second voltage threshold.

4 Claims, 10 Drawing Sheets

(51) Int. Cl.
*H01M 10/42* (2006.01)
*H01M 10/44* (2006.01)
*H01M 10/48* (2006.01)
*H02J 7/16* (2006.01)

(52) U.S. Cl.
CPC ....... *H01M 10/441* (2013.01); *H01M 10/482* (2013.01); *H02J 7/16* (2013.01); *H01M 2010/4271* (2013.01); *H02J 7/0014* (2013.01)

(56) References Cited

U.S. PATENT DOCUMENTS

| | | | | |
|---|---|---|---|---|
| 2015/0037656 | A1* | 2/2015 | Noda | H01M 10/425 |
| | | | | 429/149 |
| 2017/0120775 | A1* | 5/2017 | Murata | B60W 10/26 |
| 2018/0152028 | A1* | 5/2018 | Hsiao | H02J 7/0026 |
| 2020/0059107 | A1* | 2/2020 | Fukushima | H02J 7/16 |

FOREIGN PATENT DOCUMENTS

| | | |
|---|---|---|
| JP | 2005-176520 A | 6/2005 |
| JP | 2008-010295 A | 1/2008 |
| JP | 2009-183050 A | 8/2009 |
| JP | 2014-112039 A | 6/2014 |
| JP | 2014-225942 A | 12/2014 |
| JP | 2015-136268 A | 7/2015 |
| JP | 2016-048998 A | 4/2016 |
| WO | WO 2013/008408 A1 | 1/2013 |

* cited by examiner

ENERGY STORAGE APPARATUS AND CONTROL METHOD OF ENERGY STORAGE DEVICES

TECHNICAL FIELD

The technology disclosed in the present description relates to an energy storage apparatus and a control method of energy storage devices.

BACKGROUND ART

Conventionally, there has been an energy storage apparatus in which a plurality of energy storage devices are connected in series to obtain a predetermined voltage. The plurality of energy storage devices connected in series generate variations in charge capacity among the energy storage devices due to an imbalance in electrical characteristics. A battery charger described in Patent Document 1 below has a discharge circuit (bypass circuit) in parallel with the energy storage devices. The battery charger compares voltages of the respective energy storage devices, and uses the discharge circuit to discharge an energy storage device whose voltage difference from the lowest voltage exceeds a first predetermined value, thereby suppressing variations in charge capacity.

PRIOR ART DOCUMENT

Patent Document

Patent Document 1: JP-A-8-19188

SUMMARY OF THE INVENTION

Problems to be Solved by the Invention

When there are variations in charge capacity among the plurality of energy storage devices, the voltage of an energy storage device having a high charge rate is likely to exceed a threshold at which a malfunction may occur during charging. If the voltage of the energy storage device having a high charging rate exceeds the threshold at which a malfunction may occur, the charge current is interrupted by a current interrupting device or the like, and charging cannot be continued. When charging is suddenly interrupted by the current interrupting device, the voltage applied to the energy storage apparatus greatly increases due to the influence of a counter electromotive force due to an inductance component. Thus, a management device which manages the energy storage apparatus may be damaged.

In the present description, a technique for continuing charging so as not to cause a malfunction in energy storage devices is disclosed.

Means for Solving the Problems

An energy storage apparatus includes a plurality of energy storage devices connected in series, a voltage detection unit that detects voltages of the plurality of energy storage devices, a discharge circuit that discharges the energy storage devices, and a control unit, in which the control unit executes a discharge process of discharging only an energy storage device having a highest voltage among the plurality of energy storage devices by the discharge circuit, and a stopping process of stopping charging when a first duration elapses in a state that a voltage of the energy storage device having the highest voltage exceeds a first voltage threshold, or stopping charging when a second duration shorter than the first duration elapses in a state that the voltage of the energy storage device having the highest voltage exceeds a second voltage threshold larger than the first voltage threshold.

Advantages of the Invention

When a plurality of energy storage devices are connected in series, the total sum of voltages of the respective energy storage devices and a charge voltage are identical. A control unit discharges only an energy storage device having a highest voltage and continues charging of the other plurality of energy storage devices, thereby relatively increasing charge current values of the other plurality of energy storage devices. Then, voltages of the other plurality of energy storage devices become easy to increase, and thus a voltage of the energy storage device having the highest voltage becomes easy to decrease. In this manner, the voltage of the energy storage device having the highest voltage can be quickly reduced, and charging of the energy storage device can be continued.

When a state that discharging is not in time and the voltage of the energy storage device having the highest voltage exceeds a first voltage threshold continues for a first duration, the control unit stops charging. Alternatively, when a state that the voltage of the energy storage device having the highest voltage exceeds a second voltage threshold elapses a second duration, the control unit stops charging the energy storage device, and thus occurrence of a malfunction in the energy storage devices can be prevented.

Thus, charging can be continued so that a malfunction does not occur in an energy storage device having a highest voltage.

MODE FOR CARRYING OUT THE INVENTION

Outline of the Present Embodiment

First, an outline of an energy storage apparatus disclosed in the present embodiment will be described.

The energy storage apparatus includes a plurality of energy storage devices connected in series, a voltage detection unit that detects voltages of the plurality of energy storage devices, a discharge circuit that discharges the energy storage devices, and a control unit, in which the control unit executes a discharge process of discharging only an energy storage device having a highest voltage among the plurality of energy storage devices by the discharge circuit, and a stopping process of stopping charging when a first duration elapses in a state that a voltage of the energy storage device having the highest voltage exceeds a first voltage threshold, or stopping charging when a second duration shorter than the first duration elapses in a state that the voltage of the energy storage device having the highest voltage exceeds a second voltage threshold larger than the first voltage threshold.

In constant voltage charging in which charge management is performed using a total voltage of a plurality of energy storage devices as an index, charging is stopped only on a condition that the voltage of an energy storage device exceeds a threshold. Then, although charge rates of other energy storage devices are insufficient, charging is stopped when the voltages of part of the energy storage devices exceed the threshold.

The present inventors have intensively studied whether the charging can be continued without causing a malfunction in the energy storage device having the highest voltage. Conventionally, when performing constant voltage charging of a plurality of energy storage devices connected in series, it is controlled to discharge all energy storage devices that exceed a specified voltage or energy storage devices other than an energy storage device having a lowest voltage. In that case, the total sum of the voltages of the respective energy storage devices and the charge voltage are identical, and thus a decrease rate of the voltage of the cell having the highest voltage becomes slow.

As a result of intensive studies, the inventors of the present invention have reached discharging of only the energy storage device having the highest voltage. When only the energy storage device having the highest voltage is discharged, charge current values of the other plurality of energy storage devices increase, and the voltages of the other energy storage devices rise. It has been found that the voltage of the energy storage device having the highest voltage becomes easy to decrease.

The inventors have come to a conclusion to only discharge the energy storage device having the highest voltage by a discharge circuit during charging. In this manner, the voltage of the energy storage device having the highest voltage can be quickly reduced, and charging of the energy storage devices can be continued.

If only the energy storage device having the highest voltage is discharged but the discharging is not in time, and the state that the voltage of the energy storage device having the highest voltage exceeds the first voltage threshold continues for the first duration, the control unit stops charging of the energy storage devices. Alternatively, when the second duration elapses in a state that the discharging is not in time and the voltage of the energy storage device having the highest voltage exceeds the second voltage threshold, the control unit stops charging of the energy storage devices.

Thus, charging can be continued while suppressing occurrence of a malfunction in the energy storage device having the highest voltage.

The control unit may perform the discharge process when the energy storage device having the highest voltage among the plurality of energy storage devices exceeds the first voltage threshold.

The control unit may set a third duration shorter than the first duration as the first duration when a voltage difference among the plurality of energy storage devices is larger than a voltage difference threshold.

When the voltage difference among the plurality of energy storage devices is larger than the voltage difference threshold, variations in charge capacity among the energy storage devices are too large, and the discharge circuit cannot eliminate the variations in charge capacity among the energy storage devices. Therefore, the control unit determines that the voltage of the energy storage device having the highest voltage cannot be lowered below the first voltage threshold. Then, the control unit sets the third duration as the first duration, and thus the charging is stopped when the third duration has elapsed without waiting for elapsing of the first duration that is initially set. If it is determined that it takes a long time for the voltage of the energy storage device having the highest voltage to decrease even when the discharge circuit is operated, the control unit does not wait for the initially set first duration to elapse before charging. In this manner, a malfunction, such as deterioration, can be suppressed from occurring in the energy storage devices.

The energy storage device may be a lithium ion cell, and the plurality of energy storage devices may be chargeable by an external charger for a lead-acid battery.

Even when charging is performed with an external charger for a lead-acid battery, which has a charge voltage higher than the total voltage of a plurality of lithium-ion cells, if the energy storage device having the highest voltage exceeds the first voltage threshold, the control unit discharges only the energy storage device having the highest voltage. In this manner, the voltage of the energy storage device having the highest voltage can be quickly reduced. When it is determined that the discharge is not in time and there is a high possibility that a malfunction occurs in the energy storage device, the control unit stops charging of the energy storage devices. Thus, even if charging is performed with the external charger for a lead-acid battery, charging of lithium ion cells can be performed while preventing a malfunction from occurring in the lithium ion cells.

The energy storage apparatus includes a plurality of energy storage devices connected in series, a voltage detection unit that detects voltages of the plurality of energy storage devices, a discharge circuit that discharges the energy storage devices, and a control unit, in which the control unit discharges by the discharge circuit only an energy storage device having a highest voltage out of the plurality of energy storage devices when the plurality of energy storage devices are charged by a charger.

When the plurality of energy storage devices is charged with a charger, the control unit discharges only the energy storage device having the highest voltage and continues charging the other energy storage devices. The charge currents of the other energy storage devices become relatively high, the voltages of the other energy storage devices become easy to increase, and the voltage of the energy storage device having the highest voltage becomes easy to decrease. In this manner, the voltage of the energy storage device having the highest voltage can be quickly reduced, and charging of the energy storage devices can be continued.

The present technology can be applied to a control method of energy storage devices and a control program of energy storage devices.

First Embodiment

Figure 1:
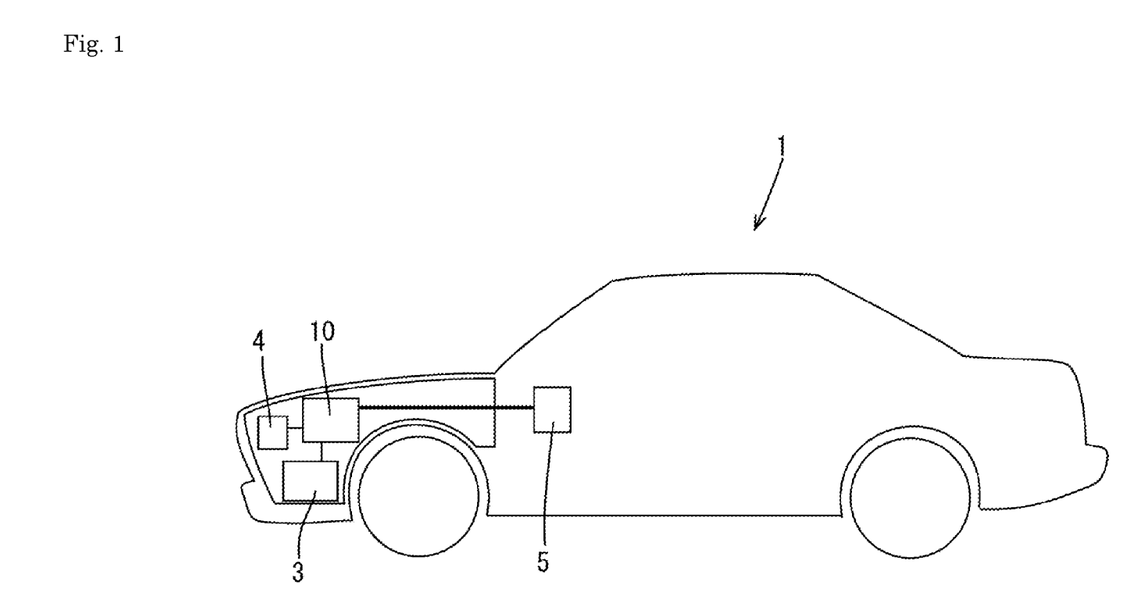
FIG. 1 is a diagram illustrating a vehicle in a first embodiment.

A first embodiment will be described with reference to FIGS. 1 to 9. As illustrated in FIG. 1, an energy storage apparatus 10 for starting an engine installed in a vehicle 1 such as an automobile will be illustrated. The energy storage apparatus 10 is connected to a vehicle load 3 such as an engine starter motor and electrical components mounted on the vehicle 1, a vehicle generator 4 such as an alternator, a vehicle Electronic Control Unit (ECU) 5, and the like.

Figure 2:
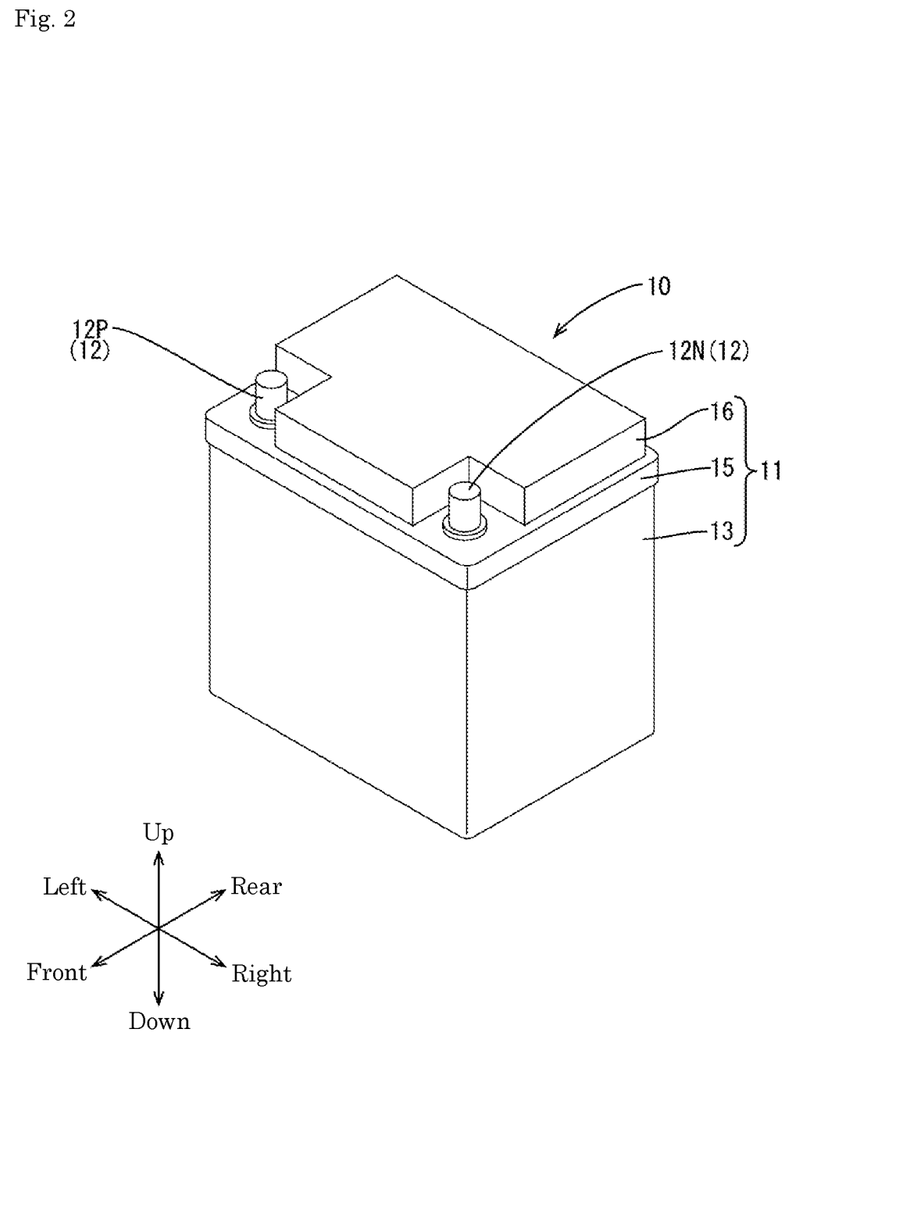
FIG. 2 is a perspective view of an energy storage apparatus.
Figure 3:
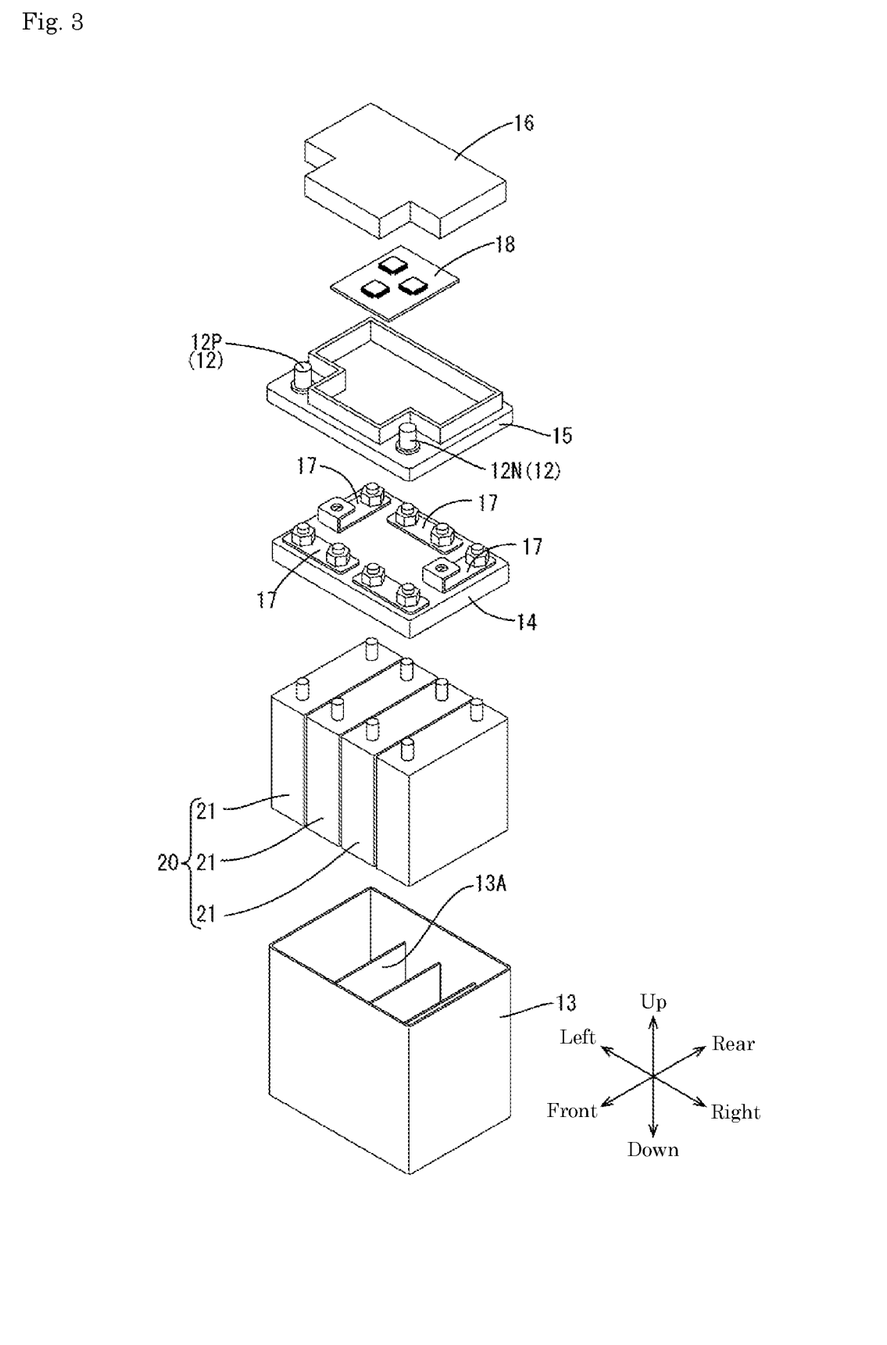
FIG. 3 is an exploded perspective view of the energy storage apparatus.

The energy storage apparatus 10 has a block-shaped battery case 11 as illustrated in FIG. 2. As illustrated in FIG. 3, the battery case 11 houses an assembled battery 20, a control board 18, and the like. The assembled battery 20 includes a plurality (four in this embodiment) of energy storage devices 21 connected in series.

In the following description, when referring to FIGS. 2 and 3, a vertical direction is based on a vertical direction of the battery case 11 when the battery case 11 is placed horizontally without being inclined on an installation surface. A front and rear direction means that a front left side in the view with reference to a direction along a short side of the battery case 11 (a depth direction) is a front side. A left and right direction will be described with a front right side in the view being a right direction with reference to a direction along a long side of the battery case 11.

The battery case 11 is made of a synthetic resin, and as illustrated in FIG. 3, a box-shaped case main body 13 that opens upward, a positioning member 14 that positions a plurality of energy storage devices 21, an inner lid 15 mounted on an upper portion of the case main body 13, and an upper lid 16 mounted on an upper portion of the inner lid 15 are provided.

In the case main body 13, four cell chambers 13A in which a plurality (four in this embodiment) of energy storage devices 21 are individually accommodated are provided side by side in the left and right direction.

The energy storage device 21 is a lithium ion cell using a negative active material of graphite-based materials such as graphite, easily graphitizable carbon, or hardly graphitizable carbon, and an iron phosphate-based positive active material such as lithium iron phosphate, and an upper limit voltage in normal use is set to 3.5 [V].

As illustrated in FIG. 3, the positioning member 14 has a plurality of bus bars 17 arranged on an upper surface. The positioning member 14 is disposed on the plurality of energy storage devices 21 disposed in the case main body 13, to thereby position the respective energy storage devices 21. As the respective energy storage devices 21, four energy storage devices 21 are connected in series by the plurality of bus bars 17. The four energy storage devices 21 constitute an assembled battery 20. An upper limit voltage of the assembled battery 20 in which the four energy storage devices 21 are connected in series is 14.0 [V].

The inner lid 15 has a substantially rectangular shape in plan view. A control board 18 can be accommodated in the inner lid 15. When the inner lid 15 is attached to the case main body 13, the assembled battery 20 and the control board 18 are connected.

To both ends in the left and right direction of the inner lid 15, as illustrated in FIGS. 2 and 3, battery terminals (not illustrated) provided in the vehicle 1 are connected, and a pair of external terminal parts 12 are provided therein. The pair of external terminal parts 12 are provided in a state of being embedded in the inner lid 15. The pair of external terminal parts 12 are made of a metal such as a lead alloy. One of the pair of external terminal parts 12 is a positive electrode terminal part 12P, and the other is a negative electrode terminal part 12N.

An external charger CH using a commercial power source can be connected to the pair of external terminal parts 12. The external charger CH is charged with a constant current in the beginning of charging. When the battery voltage of the assembled battery 20 rises to a predetermined voltage, the external charger CH performs so-called constant current constant voltage charging to continue charging while maintaining the battery voltage. Thus, the external charger CH charges the assembled battery 20 by constant current constant voltage charging.

Next, an electrical configuration of the energy storage apparatus 10 will be described with reference to FIG. 4.

Figure 4:
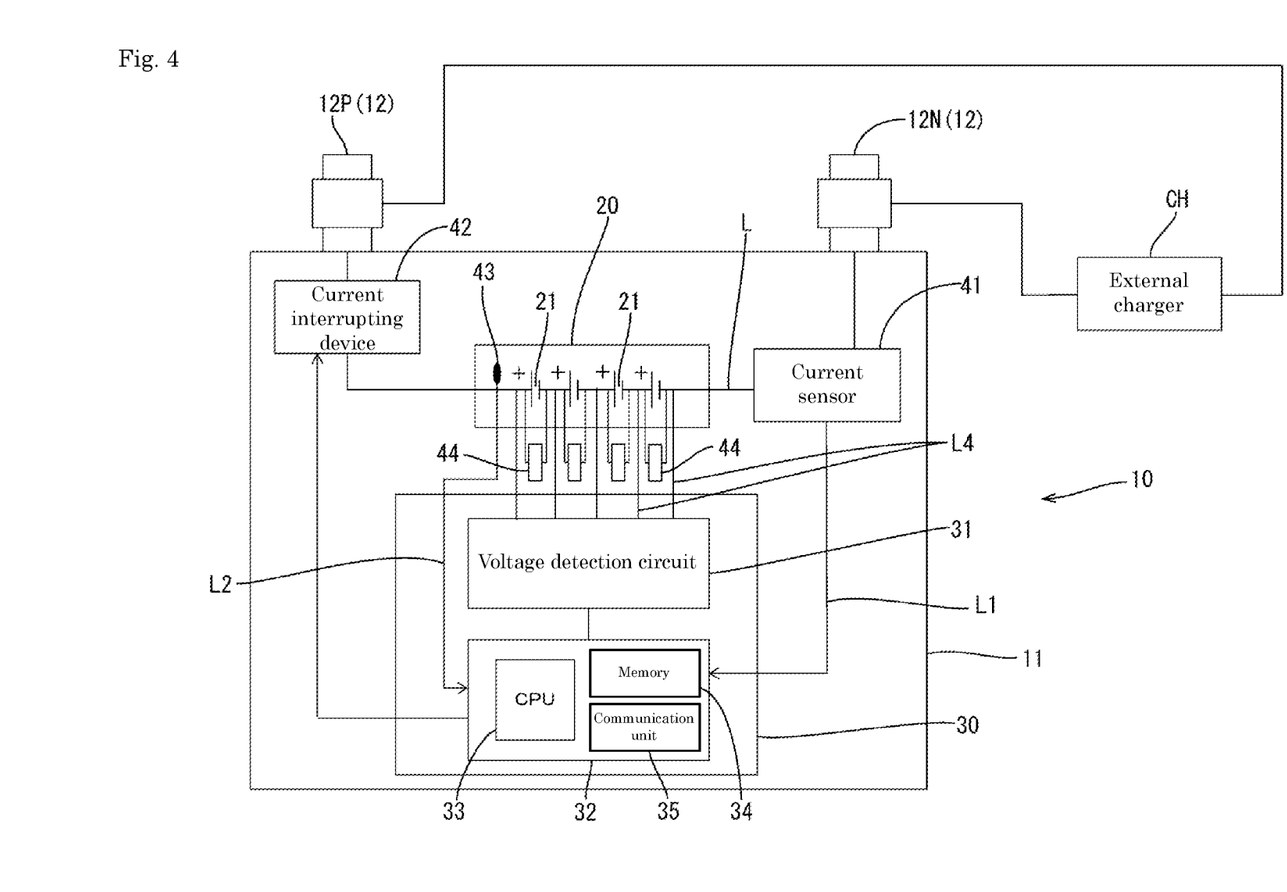
FIG. 4 is a block diagram illustrating an electrical configuration of the energy storage apparatus.

As illustrated in FIG. 4, the energy storage apparatus 10 includes an assembled battery 20, a battery management device (hereinafter referred to as "BMU") 30, a current sensor 41, a current interrupting device 42, a temperature sensor 43, and discharge circuits 44. The assembled battery 20, the BMU 30, the current sensor 41, the current interrupting device 42, the temperature sensor 43, and the discharge circuits 44 are arranged in the battery case 11.

The assembled battery 20, the current sensor 41, and the current interrupting device 42 are connected in series via a current carrying path L. A positive electrode of the assembled battery 20 is connected to the positive electrode terminal part 12P via the current interrupting device 42, and a negative electrode is connected to the negative electrode terminal part 12N via the current sensor 41. When the energy storage apparatus 10 is mounted on the vehicle 1, the positive electrode terminal part 12P and the negative electrode terminal part 12N are electrically connected to the vehicle load 3, the vehicle generator 4, the vehicle ECU 5, and the like by power cables or the like.

The current sensor 41 is a sensor that measures a current flowing through the current carrying path L. The current sensor 41 is connected to the BMU 30 by a signal line L1. A current measurement value measured by the current sensor 41 is taken into the BMU 30 through the signal line L1.

The current interrupting device 42 is a semiconductor switch such as an FET or a relay. The current interrupting device 42 interrupts the current between the assembled battery 20 and the positive electrode terminal part 12P in response to a control signal from the BMU 30.

The temperature sensor 43 is a contact type or non-contact type, and measures the temperature of the assembled battery 20. The temperature sensor 43 is connected to the BMU 30 by a signal line L2, and a temperature measurement value measured by the temperature sensor 43 is taken into the BMU 30 through the signal line L2.

Figure 5:
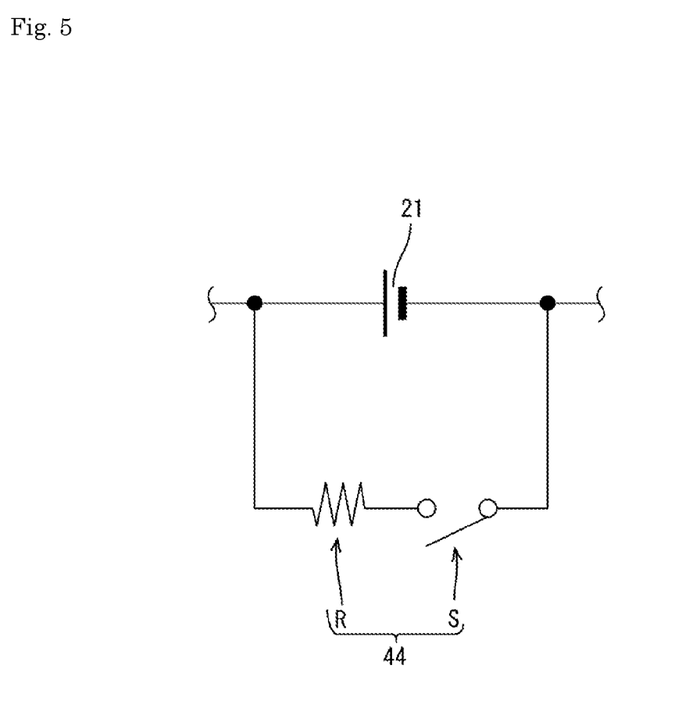
FIG. 5 is a circuit diagram of a discharge circuit.

As illustrated in FIGS. 4 and 5, the discharge circuit 44 is provided in each energy storage device 21 so as to be connected in parallel with the energy storage device 21. The discharge circuit 44 is a circuit in which a discharge resistor R and a discharge switch S are connected in series. The discharge circuit 44 discharges the energy storage devices 21 individually by closing the discharge switch S according to a command from the BMU 30.

The BMU 30 includes a voltage detection circuit 31 and a control unit 32. The voltage detection circuit 31 and the control unit 32 are mounted on the control board 18. The BMU 30 is supplied with electric power from the assembled battery 20 by being connected to the current carrying path L.

The voltage detection circuit 31 is connected to both ends of each energy storage device 21 via a voltage detection line L4. In response to an instruction from the CPU 33, the voltage detection circuit 31 detects a cell voltage of each energy storage device 21 and a battery voltage of the assembled battery 20 (the total voltage of the plurality of energy storage devices 21).

The control unit 32 includes a CPU 33 that is a central processing unit, a memory 34, and a communication unit 35.

The memory 34 is a nonvolatile memory such as a flash memory or an EEPROM. The memory 34 stores various programs such as an onboard control program that manages charge states of the respective energy storage devices 21 or the assembled battery 20 when the energy storage apparatus 10 is mounted on the vehicle 1, an equalization program that equalizes voltages among the energy storage devices, and a charge control program for when the energy storage apparatus 10 is charged by an external charger CH, data necessary for execution of the various programs (allowable potential difference, first voltage threshold, first duration, second voltage threshold, second duration, and voltage difference threshold), and the like.

The communication unit 35 can be connected to the vehicle ECU 5 via a connector (not illustrated) provided in the battery case 11. The communication unit 35 and the vehicle ECU 5 can communicate with each other by LIN communication or CAN communication.

The CPU 33 executes various programs such as the onboard control program, the equalization program, and the charge control program stored in the memory 34.

The onboard control program includes monitoring processes to constantly or periodically monitor currents, voltages, and the like of the energy storage devices 21 from output signals from the current sensor 41, the voltage detection circuit 31, the temperature sensor 43, and the like when the energy storage apparatus 10 is mounted on the vehicle 1. The onboard control program includes a process of preventing, when abnormality is detected, occurrence of a malfunction in the assembled battery 20 by outputting a control signal to the current interrupting device 42 to interrupt the current between the assembled battery 20 and the positive electrode terminal part 12P by the current interrupting device 42.

The equalization program includes a process of constantly or periodically monitoring variations in charge capacity among the respective energy storage devices 21 of the energy storage apparatus 10 from the cell voltages of the respective energy storage devices 21. The equalization program includes a process of discharging, when voltage differences among the respective energy storage devices 21 exceed a predetermined value, the energy storage device 21 having a relatively large charge amount by the discharge circuit 44, and eliminating variations of the charge capacity between the respective energy storage devices 21.

The charge control program is executed constantly or periodically and includes a process of monitoring the cell voltages of the respective energy storage devices 21. The charge control program includes a process of controlling the charge states of the respective energy storage devices 21 or the assembled battery 20 when the cell voltages of the energy storage devices 21 rise due to charging by the external charger CH using a commercial power source (charge control process).

In recent years, as a lead-acid battery used for an engine starting battery is replaced with a lithium ion assembled battery, charging of the lithium ion assembled battery by the external charger CH for a lead-acid battery is demanded. The external charger CH for a lead-acid battery performs charging of about 14.8 [V] (one example). When the energy storage apparatus 10 is charged with the maximum voltage by the external charger CH for a lead-acid battery, the cell voltage of each energy storage device 21 is 3.7 [V] when the charge capacities of the respective energy storage devices 21 are equal. There is no problem if the energy storage device made of a lithium ion cell using iron phosphate as a positive active material has a charge voltage of about 4.0 [V] per cell. If there are variations in charge capacity among the energy storage devices, the energy storage device having the highest voltage may exceed 4.0 [V] and reach a voltage at which a malfunction occurs in the energy storage device.

As a result of intensive studies, the inventors focused on that when a plurality of energy storage devices 21 are connected in series as in the assembled battery 20 of the energy storage apparatus 10, the total sum of the cell voltages of the respective energy storage devices 21 and the charge voltages are identical. Then, the inventors have found that by discharging only the energy storage device having the highest voltage (hereinafter also referred to as the "highest-voltage energy storage device") 21U, and continuing charging other energy storage devices 21 other than the highest-voltage energy storage device 21U, the voltage of the highest-voltage energy storage device 21U tends to be easy to decrease. Thus, when discharging all the energy storage devices that exceed the first voltage threshold, the voltage of the highest-voltage energy storage device 21U becomes easy to decrease compared to the case of discharging all the energy storage devices having a voltage higher than the energy storage device having the lowest voltage by a predetermined value or more.

Figure 6:
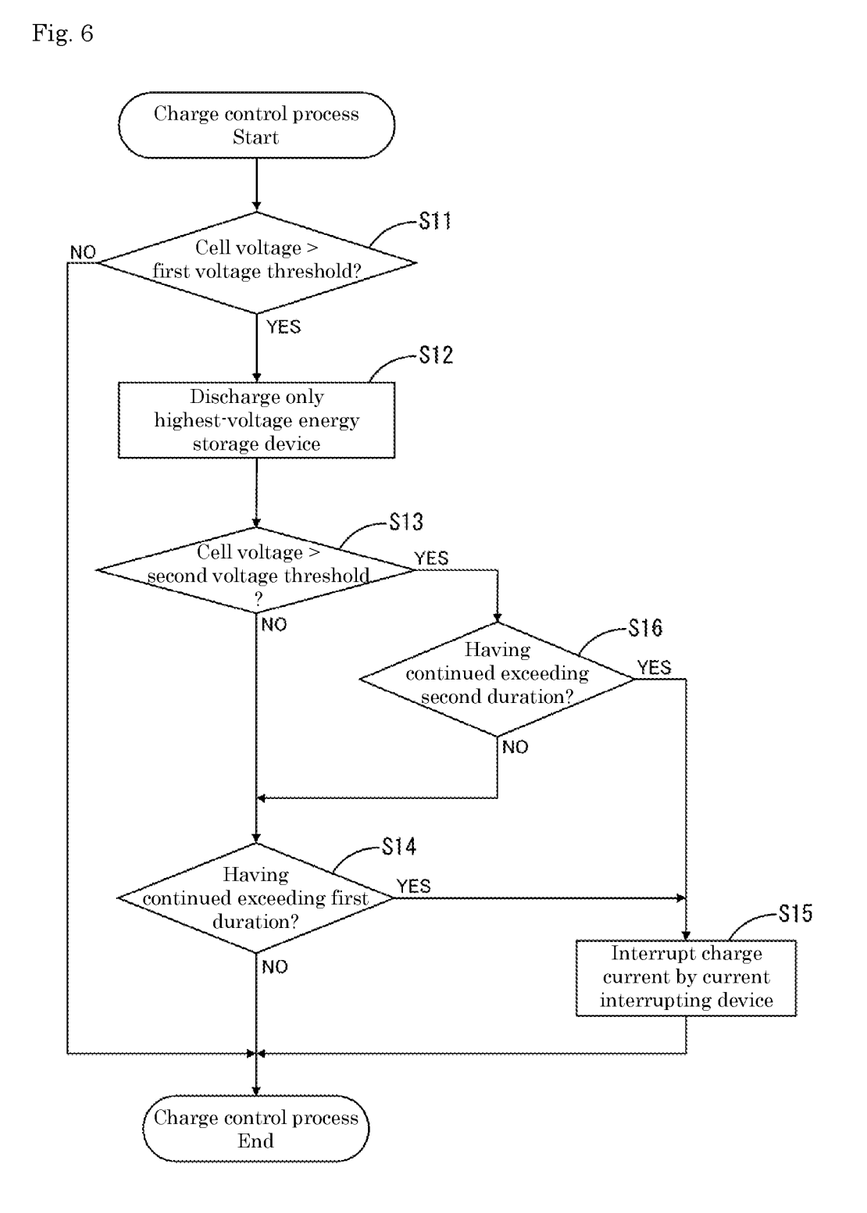
FIG. 6 is a flowchart of a charge control process.

This will be described with reference to FIG. 6.

The charge control process is executed by the CPU 33 constantly or periodically when the assembled battery 20 of the energy storage apparatus 10 is charged with constant current constant voltage by the external charger CH or the like. In the charge control process, the CPU 33 determines whether the cell voltage of each energy storage device 21 has exceeded the first voltage threshold stored in the memory 34 (S11). The "first voltage threshold" is a voltage value that a malfunction in the energy storage device 21 may occur when continued for a long time such as two hours or more.

When none of the cell voltages of the energy storage devices 21 exceed the first voltage threshold (NO in S11), the CPU 33 ends the charge control process. When the cell voltage of any one of the energy storage devices 21 has exceeded the first voltage threshold (YES in S11), the CPU 33 discharges only the highest-voltage energy storage device 21U exceeding the first voltage threshold by the discharge circuit 44 (S12). Specifically, when the plurality of energy storage devices 21 are discharged by the discharge circuit 44 according to the equalization program, the CPU 33 switches from a state of discharging the plurality of energy storage devices 21 to discharging only the highest-voltage energy storage device 21U. When discharging of all the energy storage devices 21 has not been started, the CPU 33 starts discharging of only the highest-voltage energy storage device 21U. The discharging of only the highest-voltage energy storage device 21U in S12 corresponds to a discharge process.

Further, almost simultaneously with starting of the discharge in S12, the CPU 33 determines whether the cell voltage of the highest-voltage energy storage device 21U has exceeded the second voltage threshold stored in the memory 34 (S13).

As a result of the determination in S13, when the cell voltage of the highest-voltage energy storage device 21U has not exceeded the second voltage threshold (NO in S13), the CPU 33 executes a process of S14. In S14, the CPU 33 calculates (measures) a time during which the cell voltage of the highest-voltage energy storage device 21U belongs to the range from the first voltage threshold to the second voltage threshold. The CPU 33 determines whether the calculated time has continued exceeding the first duration (S14).

As a result of the determination in S14, when a time during which the cell voltage of the highest-voltage energy storage device 21U belongs to the range from the first voltage threshold to the second voltage threshold has not exceeded the first duration (NO in S14), the CPU 33 ends the charge control process. When the time during which the cell voltage of the highest-voltage energy storage device 21U belongs to the range from the first voltage threshold to the second voltage threshold has continued exceeding the first duration (YES in S14), the CPU 33 outputs a control signal to the current interrupting device 42. The current interrupting device 42 to which the control signal has been input interrupts the current between the assembled battery 20 and the positive electrode terminal part 12P (S15). Thus, charging is stopped and the charge control process is finished. The process of S15 (the current interrupting device 42 stops charging when the time during which the cell voltage of the highest-voltage energy storage device 21U belongs to the range from the first voltage threshold to the second voltage threshold has exceeded the first duration, charging is stopped by the current interrupting device 42) corresponds to a stopping process.

As a result of the determination in S13, when the cell voltage of the highest-voltage energy storage device 21U has exceeded the second voltage threshold (YES in S11), the CPU 33 determines whether the cell voltage of the highest-voltage energy storage device 21U continues exceeding the second duration (S16).

When the cell voltage of the highest-voltage energy storage device 21U does not continue exceeding the second duration (NO in S16), the CPU 33 determines whether the time during which the cell voltage of the highest-voltage energy storage device 21U belongs to the range from the first voltage threshold to the second voltage threshold has exceeded the first duration in S14.

As a result of the determination in S16, when the cell voltage of the highest-voltage energy storage device 21U continues exceeding the second duration (YES in S16), the CPU 33 outputs a control signal to the current interrupting device 42. The current interrupting device 42 to which the control signal is input interrupts the current between the assembled battery 20 and the positive electrode terminal part 12P. Thus, charging is stopped and the charge control process is finished.

Figure 7:
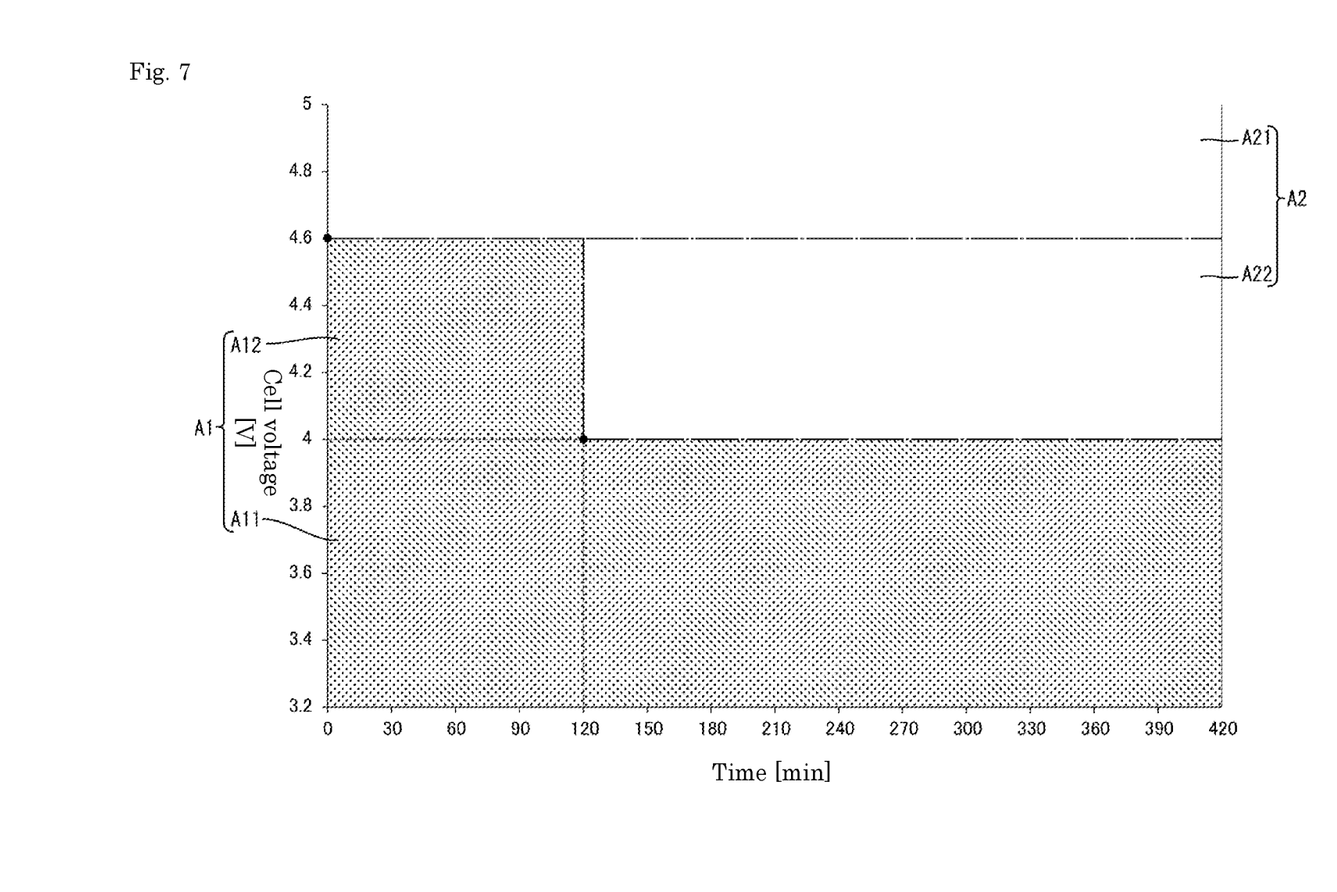
FIG. 7 is a graph illustrating a charge allowable area and a charge non-allowable area in relation to cell voltage and time.

FIG. 7 is a graph illustrating a charge allowable area A1 in which charging is allowed and a charge non-allowable area A2 in which charging is not allowed in the relationship between the cell voltage and time. In FIG. 7, the X axis represents the cell voltage [V] of the highest-voltage energy storage device 21U, and the Y axis represents time [min]. The time [min] on the Y axis indicates the time from a start of discharging.

In FIG. 7, an area where the cell voltage does not exceed the first voltage threshold of 4.0 [V] is defined as a first allowable area A11. An area where the cell voltage exceeds 4.0 [V], which is the first voltage threshold, and the discharge time exceeds 2 hours, which is the first duration, is defined as a second allowable area A12. The charge allowable area A1 in which charging can be allowed is an area obtained by combining the first allowable area A11 and the second allowable area A12. An area where the cell voltage exceeds 4.6 [V], which is the second voltage threshold, and the discharge time exceeds 2 seconds, which is the second duration, is also included in the charge allowable area A1 in which charging is allowed. The area where the cell voltage exceeds the second voltage threshold of 4.6 [V], and the discharge time exceeds 2 seconds, which is the second duration, is a very small area and thus is omitted in FIG. 7. An area where the cell voltage exceeds 4.6 [V], which is the second voltage threshold, and the discharge time exceeds 2 seconds, which is the second duration, is defined as a first non-allowable area A21. An area where the cell voltage exceeds 4.0 [V], which is the first voltage threshold, and the discharge time exceeds 2 hours, which is the first duration, is defined as a second non-allowable area A22. The charge non-allowable area A2 in which charging is not allowed is an area obtained by combining the first non-allowable area A21 and the second non-allowable area A22.

Figure 8:
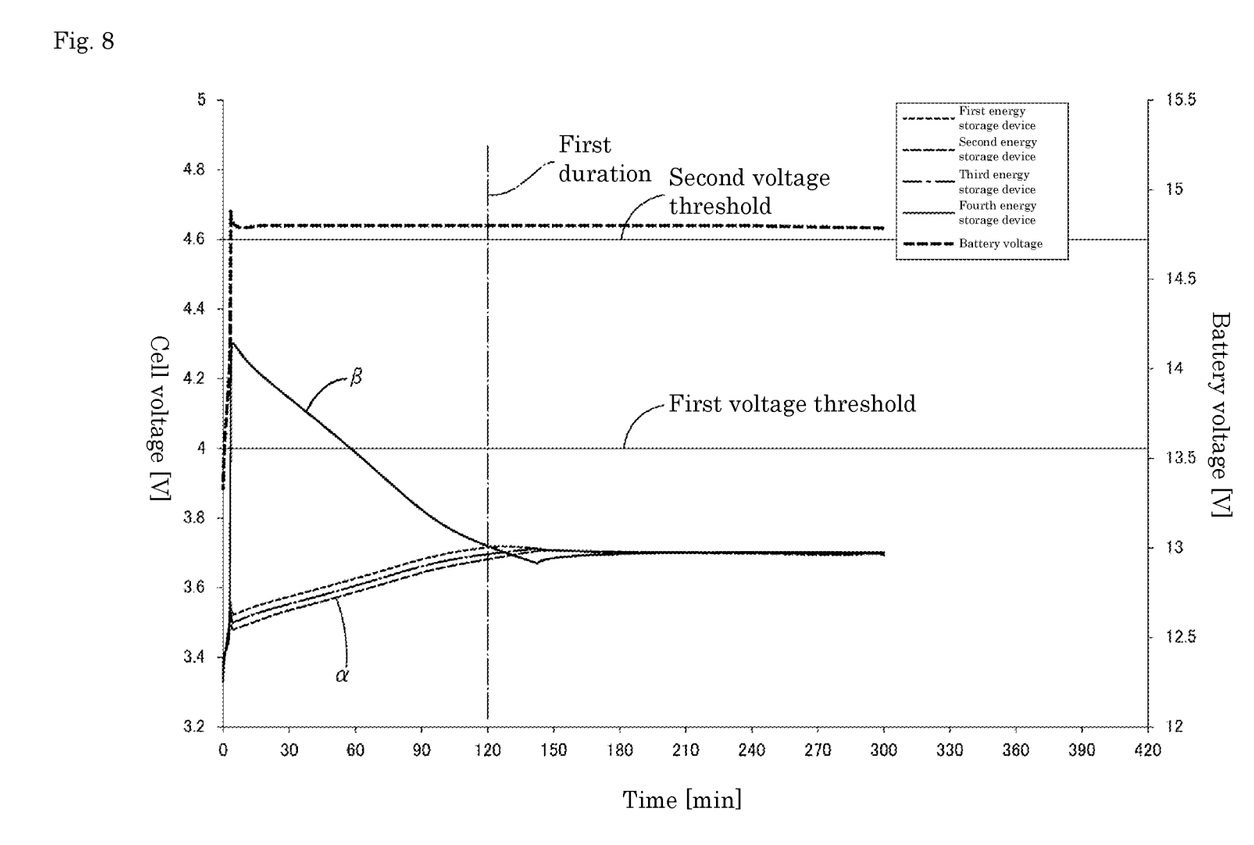
FIG. 8 is a graph illustrating time transitions of respective cell voltages during charging in the energy storage apparatus of the first embodiment.

FIG. 8 illustrates time transitions of the cell voltages (battery voltage of the assembled battery 20) of respective energy storage devices 21 when the energy storage apparatus 10 is charged by the external charger CH for a lead-acid battery. In FIG. 8, the X-axis represents time [min], and the Y-axis represents the cell voltages [V] of the energy storage devices 21 and the battery voltage of the assembled battery 20 (total voltage of the plurality of energy storage devices 21). The time on the X axis indicates the time from a start of charging.

As illustrated in FIG. 8, when charging of the assembled battery 20 of the energy storage apparatus 10 is started, the cell voltage of each energy storage device 21 and the battery voltage of the assembled battery 20 rise, and variations in charge capacity occur among respective energy storage devices 21. When about 3 minutes elapses after the start of charging, voltage differences between the voltage of the first energy storage device α, which is the energy storage device having a lowest voltage (hereinafter also referred to as "lowest-voltage energy storage device") 21L, and the other three energy storage devices 21 become large. When the voltage differences increase, by the equalization program, the CPU 33 starts the process of discharging the energy storage devices 21 other than the first energy storage device α, which is the lowest-voltage energy storage device 21L, by the respective discharge circuits 44.

When variations in cell voltage between the fourth energy storage device β, which is the highest-voltage energy storage device 21U, and the other energy storage devices 21 are equal to or more than a predetermined value, as illustrated in FIG. 8, the variations in cell voltage between the fourth energy storage device β and the other energy storage devices 21 increase. As a result, the cell voltage of the fourth energy storage device β, which is the highest-voltage energy storage device 21U, rapidly increases.

In S11, the CPU 33 determines whether the cell voltages of the energy storage devices 21 have exceeded the first voltage threshold (4.0 [V]). At about 4 minutes after charging, the cell voltage of the fourth energy storage device β is about 4.3 [V], which has exceeded the first voltage threshold (4.0 [V]) (see FIG. 8). In S12, the CPU 33 stops discharging of the energy storage devices 21 other than the fourth energy storage device β and switches to discharging of only the fourth energy storage device β.

At the same time, in S13, the CPU 33 determines whether the cell voltage of the fourth energy storage device β has exceeded the second voltage threshold (4.6 [V]). In FIG. 8, since the cell voltage of the fourth energy storage device β has not exceeded the second voltage threshold (4.6 [V]), in S14, the CPU 33 calculates (measures) a time during which the cell voltage of the fourth energy storage device β belongs to the range from the first voltage threshold of (4.0 [V]) to the second voltage threshold (4.6 [V]). That is, the CPU 33 measures the time during which the cell voltage is maintained to be a voltage between the first voltage threshold and the second voltage threshold after the cell voltage exceeded the first voltage threshold. Then, the CPU 33 determines whether the calculated time has exceeded the first duration (2 hours).

As a result of the determination, when the time during which the cell voltage of the fourth energy storage device β belongs to the range from the first voltage threshold (4.0 [V]) to the second voltage threshold (4.6 [V]) has exceeded the first duration (2 hours), the CPU 33 interrupts the charge current by the current interrupting device 42.

In the charge control process, when the cell voltage of the energy storage device 21 has exceeded the first voltage threshold, in S12, the CPU 33 switches from a state that all of the second energy storage device to the fourth energy storage device other than the first energy storage device α, which is the lowest-voltage energy storage device, are discharged to a state that only the fourth energy storage device β is discharged. As a result, as illustrated in FIG. 8, the time during which the cell voltage of the fourth energy storage device β belongs to the range from the first voltage threshold (4.0 [V]) to the second voltage threshold (4.6 [V]) is within the first duration. Therefore, since the voltage variations of the respective energy storage devices 21 are eliminated within the first duration, subsequent charging can be continued.

Figure 9:
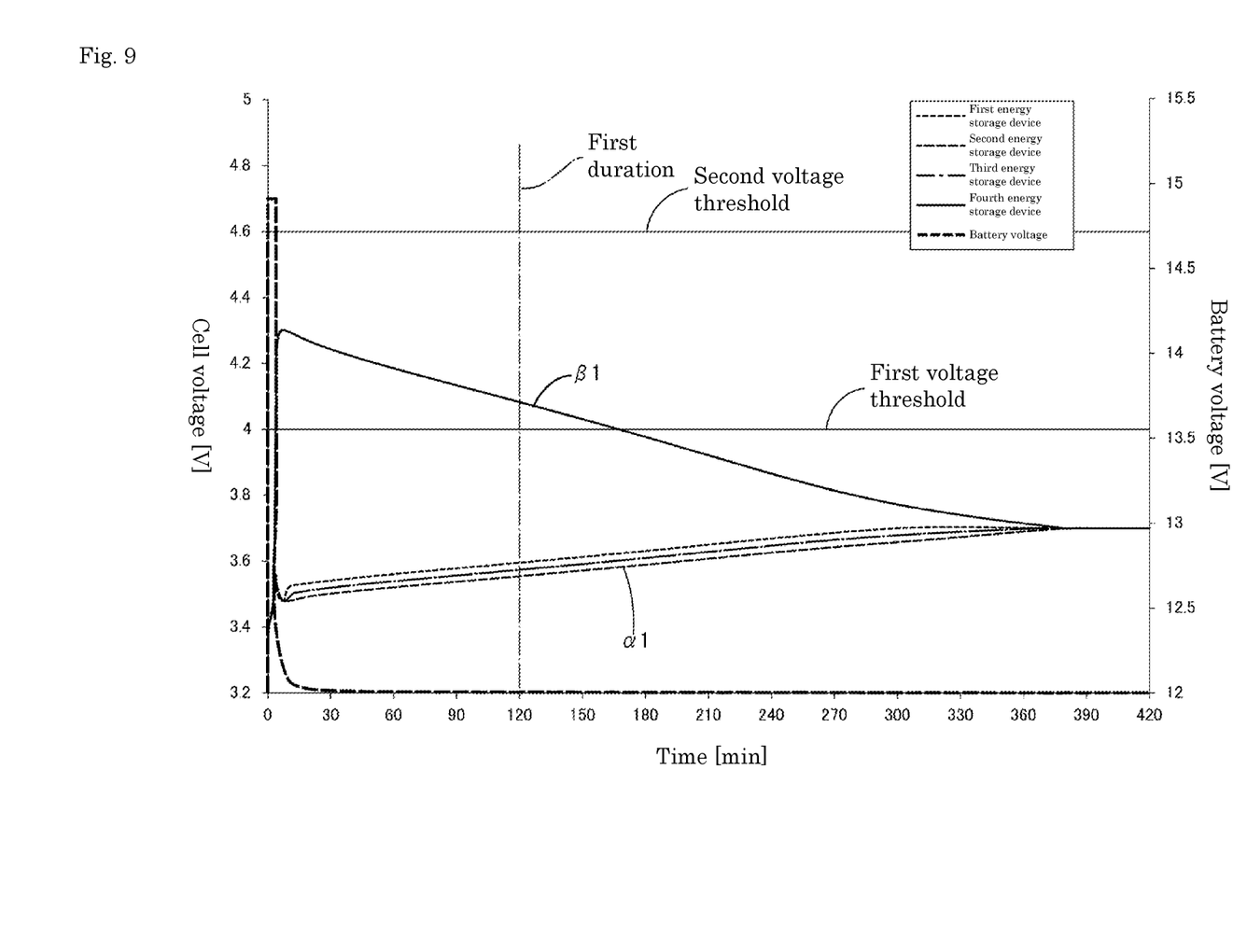
FIG. 9 is a graph illustrating time transitions of respective cell voltages during charging in a comparative energy storage apparatus.

FIG. 9 illustrates time transitions of respective energy storage devices in a comparative energy storage apparatus that does not stop discharging of the energy storage devices 21 other than the fourth energy storage device β1. In FIG. 9, the X-axis represents time [min], and the Y-axis represents the cell voltages [V] of the energy storage devices 21 and the battery voltage of the assembled battery 20 (total voltage of the plurality of energy storage devices 21).

When all of the second energy storage device to the fourth energy storage device other than the first energy storage device α, which is the lowest-voltage energy storage device, are discharged, as illustrated in FIG. 9, at a time when voltage differences between the voltage of the first energy storage device α1, which is the lowest-voltage energy storage device 21L, and the other three energy storage devices 21 become large, the CPU 33 performs the following process. The CPU 33 starts the process of discharging the energy storage devices 21 other than the first energy storage device α1 by the respective discharge circuits 44 according to the equalization program. After the start of discharging, even when the cell voltage of the fourth energy storage device β1, which is the highest-voltage energy storage device 21U, has exceeded the first voltage threshold (4.0 [V]), discharging of all the energy storage devices 21 other than the first energy storage device α1, which is the lowest-voltage energy storage device 21L, is continued.

When the discharging of all the energy storage devices 21 other than the first energy storage device α1, which is the lowest-voltage energy storage device 21L, is continued, the fourth energy storage device β is difficult to be discharged. Accordingly, as illustrated in FIG. 9, the time during which the cell voltage of the fourth energy storage device β1 belongs to the range from the first voltage threshold (4.0 [V]) to the second voltage threshold (4.6 [V]) exceeds the first duration (2 hours). When the time during which the cell voltage of the fourth energy storage device 131 belongs to the range from the first voltage threshold to the second voltage threshold exceeds the first duration (2 hours), the CPU 33 interrupts the charge current by the current interrupting device 42 because the energy storage device 21 may malfunction.

In the energy storage apparatus 10, when the cell voltage of the fourth energy storage device β, which is the highest-voltage energy storage device 21U, has exceeded the first voltage threshold (4.0 [V]), the CPU 33 stops discharging of the energy storage devices 21 other than the fourth energy storage device β, and switches to discharging of only the fourth energy storage device β, which is the highest-voltage energy storage device 21U. In this manner, the fourth energy storage device β becomes easy to discharge, and the cell voltage of the fourth energy storage device β, which is the highest-voltage energy storage device 21U, can be quickly reduced.

By switching to discharging of only the highest-voltage energy storage device 21U, the cell voltage of the highest-voltage energy storage device 21U can be lowered as compared to the case where all the energy storage devices that have exceeded the first voltage threshold are discharged, or all the energy storage devices that have a voltage higher by a predetermined value than the lowest-voltage energy storage device having the lowest voltage are discharged. It is possible to continue charging of the energy storage apparatus 10 while suppressing occurrence of a malfunction in the respective energy storage devices 21.

If the time during which the cell voltage of the fourth energy storage device β belongs to the range from the first voltage threshold (4.0 [V]) to the second voltage threshold (4.6 [V]) has exceeded the first duration (2 hours), the CPU 33 interrupts the charge current by the current interrupting device 42. In addition, if the cell voltage of the fourth energy storage device β has exceeded the second voltage threshold (4.6 [V]), the CPU 33 interrupts the charge current by the current interrupting device 42. By interrupting the charge current, it is possible to suppress occurrence of a malfunction in the fourth energy storage device β, which is the highest-voltage energy storage devices 21U, the assembled battery 20, and the energy storage apparatus 10.

Second Embodiment

A second embodiment will be described with reference to FIG. 10.

A charge control process of the second embodiment is changed in part from the charge control process of the first embodiment. In the following description, since configurations, operations, and effects common to the first embodiment are redundant, descriptions thereof are omitted. Further, the same reference signs are used for the same configurations as those of the first embodiment.

Figure 10:
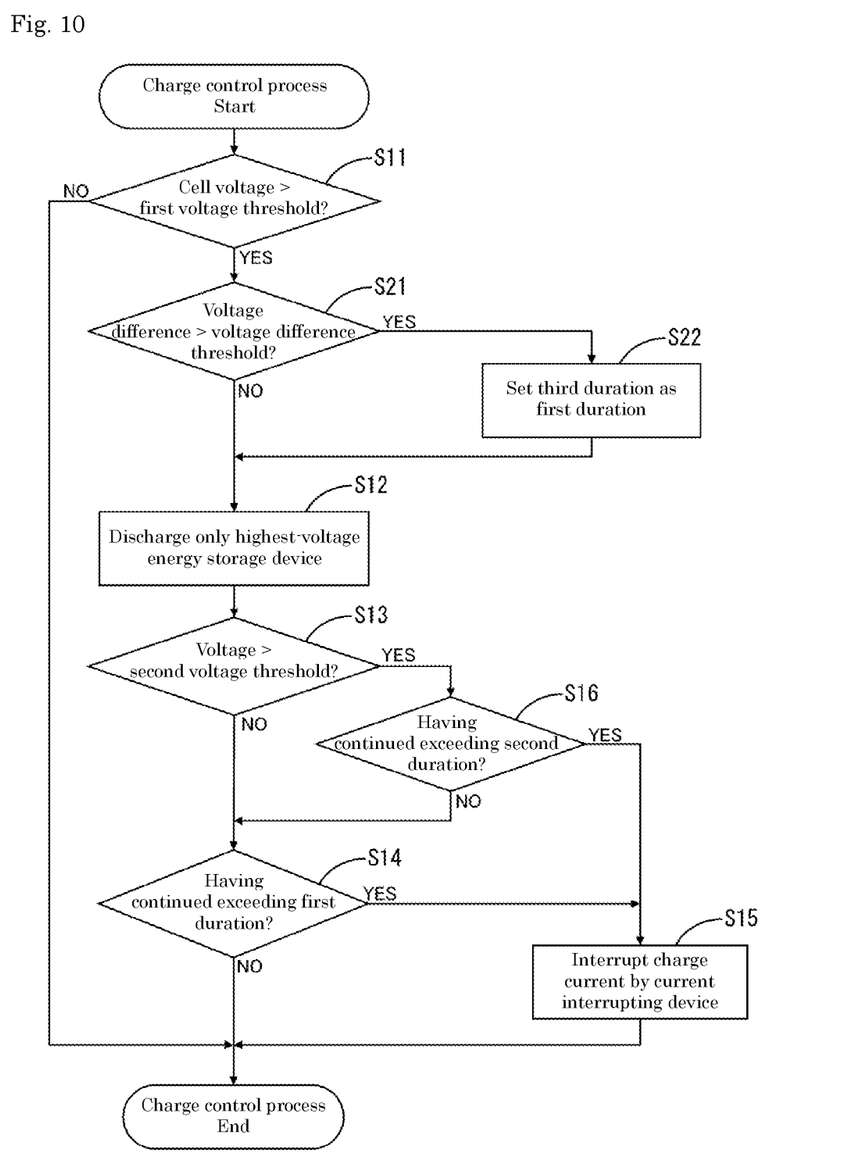
FIG. 10 is a flowchart of a charge control process in a second embodiment.

In the charge control process of the second embodiment, as illustrated in FIG. 10, the CPU 33 determines whether the cell voltages of the energy storage devices 21 exceed the first voltage threshold (4.0 [V]) (S11). In the process of S11, when the cell voltage of the highest-voltage energy storage device 21U has exceeded the first voltage threshold (YES in S11), the CPU 33 calculates a voltage difference between the cell voltage of the highest-voltage energy storage device 21U and the cell voltage of the lowest-voltage energy storage device 21L. The CPU 33 determines whether the calculated voltage differences have exceeded the voltage difference threshold stored in the memory 34 (S21). The "voltage difference threshold" is an allowable value for voltage differences, and is 600 [mV] as an example. The "voltage difference threshold" is a voltage difference that causes the time for eliminating variations in charge capacity (cell voltage) among the energy storage devices 21 to become long even when the discharge circuit 44 is operated, and exceed a range in which a malfunction such as deterioration does not occur in the energy storage devices 21.

As a result of S21, when the voltage difference between the cell voltage of the highest-voltage energy storage device 21U and the cell voltage of the lowest-voltage energy storage device 21L has not exceeded the voltage difference threshold (NO in S21), the CPU 33 executes S12 and subsequent steps. When the voltage difference has exceeded the voltage difference threshold (YES in S21), the CPU 33 sets a third duration (10 seconds) shorter than the first duration (2 hours) as the first duration (S22), and executes S12 and subsequent steps.

When the difference in cell voltage among the energy storage devices 21 is larger than the voltage difference threshold, the CPU 33 determines that variations in charge capacity among the energy storage devices 21 are too large. Even when discharging is performed by the discharge circuit 44, it takes a long time to eliminate the variations in charging capacity among the energy storage devices 21. Accordingly, the third duration is set as the first duration. Thus, charging can be stopped when the third duration has elapsed without waiting for elapsing of the first duration set initially.

In a case of the voltage difference that causes the time for eliminating the variations in charge capacity (cell voltage) among the energy storage devices 21 to become long even when the discharge circuit 44 is operated, the first duration is shortened. Thus, it is possible to avoid performing charging with a heavy load to the highest-voltage energy storage device 21U and the assembled battery 20.

Other Embodiments

The technology disclosed in the present description is not limited to the embodiments described with reference to the above description and drawings, and includes, for example, various aspects as follows.

(1) In the above embodiments, the charge control process is performed when the energy storage apparatus 10 is charged by the external charger CH for a lead-acid battery. The charge control process may be executed when the energy storage apparatus 10 is charged by an external charger for a lithium ion battery (2) In the above embodiments, the first voltage threshold is set to 4.0 [V], the second voltage threshold is set to 4.6 [V], the first duration is set to 2 hours, the second duration is set to 2 seconds, the third duration is set to 10 seconds, and the voltage difference threshold is set to 600 [mV]. The first voltage threshold, the second voltage threshold, the first duration, the second duration, the third duration, and the voltage difference threshold are not limited to the numerical examples of the embodiments, but may be changed as appropriate according to the characteristics of the energy storage device.

(3) In the above embodiments, the CPU 33 executes the charge control process constantly or periodically. The charge control process may be performed when charging by the external charger is started. For example, when the BMU detects a charge current in a state that LIN communication with the vehicle is not performed, it may be determined that charging by the external charger has started and the charge control process may be executed.

(4) In the second embodiment, when it is determined that the cell voltage of the highest-voltage energy storage device 21U has exceeded the first voltage threshold, the CPU 33 calculates the voltage difference between the cell voltage of the highest-voltage energy storage device 21U and the cell voltage of the lowest-voltage energy storage device 21L. Further, the CPU 33 determines variations in charge capacity (cell voltage) among the energy storage devices based on the calculated voltage difference. The CPU 33 may determine the variations in charge capacity (cell voltage) based on the time from the previous operation of the discharge circuit. The variations in charge capacity (cell voltage) may be determined based on the variations in charge capacity when the energy storage apparatus is shipped.

(5) In the above embodiments, the energy storage devices 21 are lithium ion cells. The energy storage devices may be battery cells or capacitors other than the lithium ion cells.

(6) In the above embodiments, the energy storage apparatus 10 mounted on the vehicle 1 is charged by the external charger CH. After charging with a constant current, the external charger CH switches to constant voltage charging when the total voltage of the assembled battery 20 reaches a predetermined voltage. For example, the external charger CH stops charging when the charge current becomes equal to or less than a threshold. In a case of a charging method to control charging of the energy storage apparatus 10 while monitoring only the total voltage and charge current of the assembled battery 20 without monitoring the voltage of each energy storage device 21, even when there is a difference in cell voltage among the energy storage devices, charging is continued as long as the total voltage maintains the predetermined voltage. Since charging cannot be controlled according to the cell voltage of each energy storage device, if there is a difference in cell voltage among the energy storage devices, a part of the cell voltage tends to increase. When a device for charging an energy storage apparatus performs charging while monitoring only the total voltage or charge current of the assembled battery 20, the present invention can be widely applied to the energy storage apparatus. The device for charging the energy storage apparatus is not limited to the external charger CH, and may be an alternator mounted on the vehicle 1 as long as it is a device that performs charging while monitoring only the total voltage and charge current of the assembled battery 20.

When the BMU 30 does not have a communication function with the vehicle 1, even if the BMU 30 monitors the voltage of each energy storage device 21, this information is not transmitted to the vehicle 1. Thus, the alternator of the vehicle 1 charges the energy storage apparatus 10 while monitoring only the total voltage and charge current of the assembled battery 20 without monitoring the voltage of each energy storage device 21. Therefore, the present invention can also be applied to the energy storage apparatus 10 mounted on the vehicle 1 that does not have a communication function with the BMU 30.

(7) In the above embodiments, the energy storage apparatus 10 is mounted on a four-wheel vehicle, but may be mounted on a motorcycle. An alternator mounted on a motorcycle generally charges the energy storage apparatus 10 while monitoring only the total voltage and charge current of the assembled battery 20. By applying the present technology to the energy storage apparatus 10 mounted on the motorcycle, charging can be continued while suppressing voltage increase of the energy storage device having the highest voltage.

(8) In the above embodiments, the energy storage apparatus 10 is mounted on the vehicle 1. The present invention is not limited to the energy storage apparatus 10 for a vehicle, but may be applied to an energy storage apparatus for industrial use. For example, the present invention may be applied to an energy storage apparatus for uninterruptible power systems, an energy storage apparatus for a solar power generating system, or an energy storage apparatus for demand control provided in a demand facility (load facility) of a power system (for control to suppress the peak value of power consumption). In industrial energy storage apparatus, a total voltage of the assembled battery 20 is high and the number of energy storage devices 21 connected to each other in series is large as compared to those for a vehicle. When the number of energy storage devices 21 connected to each other in series is large, voltage variations of respective energy storage devices accumulate. Since the accumulated voltage variations are applied to the cell having a highest charging rate, the cell having the highest charging rate may reach an abnormal voltage even when the voltage variations of the respective energy storage devices are small. By applying the present invention to an industrial energy storage apparatus, charging can be continued while suppressing a voltage increase of the energy storage device having the highest voltage.

(9) In the above embodiments, when the cell voltage of any one of the energy storage devices 21 has exceeded the first voltage threshold during charging (YES in S11), the CPU 33 discharges only the highest-voltage energy storage device 21U having exceeded the first voltage threshold by the discharge circuit 44. The CPU 33 may discharge only the highest-voltage energy storage device 21U by the discharge circuit 44 when the cell voltage of any one of the energy storage devices 21 has exceeded an arbitrary voltage threshold during charging. For example, the CPU 33 may discharge only the highest-voltage energy storage device 21U by the discharge circuit 44 when the cell voltage of any one of the energy storage devices 21 exceeds a voltage threshold (3.5 V as an example) smaller than the first voltage threshold 4 V. Further, the CPU 33 may discharge only the highest-voltage energy storage device 21U by the discharge circuit 44 when the cell voltage of any one of the energy storage devices 21 exceeds a voltage threshold (4.1 V as an example) that is larger than the first voltage threshold 4 V and smaller than the second voltage threshold 4.6 V.

DESCRIPTION OF REFERENCE SIGNS

10: Energy storage apparatus
21: Energy storage device
30: BMU (example of "control unit")
31: Voltage detection circuit (example of "voltage detection unit")
32: Control unit
44: Discharge circuit
CH: External charger

The invention claimed is:

1. An energy storage apparatus comprising:
a plurality of energy storage devices connected in series;
a voltage detection unit that detects voltages of the plurality of energy storage devices;
a discharge circuit that discharges the energy storage devices; and
a control unit, wherein the control unit executes:
a discharge process of discharging only an energy storage device having a highest voltage among the plurality of energy storage devices by the discharge circuit; and
a stopping process of stopping charging when a first duration elapses in a state that a voltage of the energy storage device having the highest voltage exceeds a first voltage threshold, or stopping charging when a second duration shorter than the first duration elapses in a state that the voltage of the energy storage device having the highest voltage exceeds a second voltage threshold larger than the first voltage threshold.

2. The energy storage apparatus according to claim 1, wherein the control unit performs the discharge process when the energy storage device having the highest voltage among the plurality of energy storage devices exceeds the first voltage threshold.

3. The energy storage apparatus according to claim 1, wherein the control unit sets a third duration shorter than the first duration as the first duration when a voltage difference among the plurality of energy storage devices is larger than a voltage difference threshold.

4. The energy storage apparatus according to claim 1, wherein
the energy storage devices comprise lithium ion cells, and
the plurality of energy storage devices is chargeable by an external charger for a lead-acid battery.

* * * * *